Patented May 1, 1951

2,551,562

UNITED STATES PATENT OFFICE 2,551,562

COMPOSITIONS CONSISTING ESSENTIALLY OF CHLORINATED META DIPHENYLBENZENE AND CHLORINATED PARA DIPHENYLBENZENE AND PROCESS OF PREPARING SAME

Russell L. Jenkins, Anniston, Ala., assignor to Monsanto Chemical Company, St. Louis, Mo., a corporation of Delaware No Drawing. Application September 26, 1946, Serial No. 699,587

14 Claims. (Cl. 252—66)

This invention relates to new compositions of matter consisting essentially of chlorinated meta-diphenylbenzene and chlorinated para-diphenylbenzene and to a process of producing same.

Heretofore, complex mixtures containing chlorinated diphenylbenzenes have been produced in a variety of ways. One method which has been employed comprised directly chlorinating the crude product obtained in the manufacture of biphenyl by the pyrolysis of benzene. A second method involved distillation of the above crude product under atmospheric pressure and at a temperature of 200° C. to 270° C. to remove technical biphenyl and subsequent chlorination of the high boiling residue to form a composition containing chlorinated diphenylbenzenes and high boiling related chlorinated aromatic compounds. As a modification of the second process, the high boiling residue was first heated to 390° C. to 400° C. to divide it into a still bottoms fraction and a narrower fraction of high boiling compounds known as "distilled high boiler" and then the latter fraction was chlorinated and distilled to produce a complex mixture including chlorinated diphenylbenzenes.

The chlorinated products obtained by the methods hereinbefore described are not mixtures consisting essentially of chlorinated meta-diphenylbenzene and chlorinated para-diphenylbenzene, but compositions containing chlorinated ortho-, meta- and para-diphenylbenzenes together with various other chlorinated aromatic compounds.

Contrary to expectations, it is not commercially feasible to chlorinate the raw materials used in the above processes and then attempt to isolate the desired product by distillation. The reason for this is that when the chlorination is carried out for a period of time sufficient to ensure the desired degree of chlorination of meta- and para-diphenylbenzene, it is not possible, in view of the high boiling chlorinated compounds produced, to obtain substantially complete separation of the mixture of chlorinated meta- and para-isomers. Moreover, if an effort is made to avoid this difficulty by reducing the amount of chlorination, all of the meta -and para-diphenylbenzenes are not chlorinated to the desired extent so that in either event, the product yield upon distillation is inordinately low.

One apparently obvious method of producing the desired product was to chlorinate the individual isomers and then mix the chlorinated products together in the desired proportions. This method of operation, however, was not successful because when an attempt was made to distill chlorinated para-diphenylbenzene, it decomposed notwithstanding the fact that absolute pressures of the order of 3-4 mm. of mercury were used.

The present invention, therefore, has as its object the provision of a process which overcomes the above difficulties and at the same time yields a product consisting essentially of varying proportions of chlorinated meta-diphenylbenzene and chlorinated para-diphenylbenzene.

An additional object is to provide a new composition of matter which increases the heat distortion temperature and lessens the plastic flow of vinyl aromatic polymers and copolymers.

A further object is to provide a new composition of matter which, when incorporated in vinyl aromatic polymers or copolymers, results in non-inflammable compositions that are further characterized by improved heat distortion temperatures, increased resistance to plastic flow and excellent electrical properties.

These and other objects are attained by chlorinating a mixture of meta-diphenylbenzene and para-diphenylbenzene to the desired extent, say from 50% to 69.7% and preferably from 67% to 69.7% by weight of chlorine, recovering the resulting product by distillation, and then compounding this product with vinyl aromatic polymers and copolymers in the manner described in application Ser. No. 566,947, filed December 6, 1944, now Patent No. 2,454,255, issued November 16, 1948, in the name of Joseph R. Mares.

The mixture of meta- and para-diphenylbenzenes used in the present process may be prepared synthetically by mixing the individual isomers in the desired proportions, but I preferably employ the meta-para diphenylbenzene fraction obtainable by the method hereinafter described, and also by the method disclosed in application Ser. No. 451,492, now Patent No. 2,489,215, issued November 22, 1949, filed in the name of Russell L. Jenkins. By these methods mixtures of meta-diphenylbenzene and para-diphenylbenzene are obtained which may vary in composition as follows depending upon the distillation conditions employed.

I. Meta-diphenylbenzene __per cent__ 75-40
   Para-diphenylbenzene _____do____ 25-60
   Crystallization point _____°C__ 150-190
II. Meta-diphenylbenzene __per cent__ 75-65
   Para-diphenylbenzene _____do____ 25-35
   Crystallization point _____C°__ 150-160
III. Meta-diphenylbenzene __per cent__ 70
   Para-diphenylbenzene _____do____ 30
   Crystallization point _____°C__ 156

For example, composition I is prepared in the following manner.

A quantity of biphenyl high boiler having approximately the following composition:

|  | Per cent |
|---|---|
| Biphenyl | 1 |
| Ortho-diphenylbenzene | 9 |
| Meta-diphenylbenzene | 42 |
| Para-diphenylbenzene | 18 |
| Triorthophenylene, quaterphenyls and other high boiling compounds | 30 | is charged to an atmospheric still provided with a fractionating column and distilled to separate a fraction boiling at a temperature from 250° C. to 330° C., which fraction contains minor amounts of biphenyl normally occurring in the high boiling residue. The temperature of the column is increased through the range of 330° C. to 350° C. and a second fraction is thereby obtained. This fraction which constitutes about 6% of the usual charge consists essentially of ortho-diphenylbenzene. The temperature is again raised and a third fraction boiling within the range of 350° C. to 375° C. is collected. This fraction generally comprises about 10% of the charge. After separating the third fraction, the temperature of the column is increased to about 385° C. and a fourth fraction is collected. This fourth fraction which normally boils over the range of 375° C. to 385° C. constitutes about 48% of the charge to the still and consists essentially of a mixture of 75% meta-diphenylbenzene and 25% para-diphenylbenzene. The temperature of the column is further increased to a still higher value and a fifth fraction having a boiling range of 385° C. to 390° C. is recovered. This fraction consists of 60% para-diphenylbenzene and 40% meta-diphenylbenzene and comprises about 8% of the still charge.

Either fraction four or five or various combinations of these two fractions may be used in obtaining the broad range of components indicated in composition I.

Composition I may also be produced by subjecting biphenyl high boiler to an absolute pressure of 55 mm. of mercury and a temperature of from 225° C. to 268° C. to separate a cut containing biphenyl and ortho-diphenylbenzene and then, while applying the same absolute pressure, raising the temperature of the residue from 268° C. to 279° C. to distill a fraction consisting of 75% of meta-diphenylbenzene and 25% para-diphenylbenzene, which fraction comprises about 48% of the still charge. The temperature of the residue is then raised from 279° C. to 283° C., while using the same absolute pressure of 55 mm. of mercury, and a fraction is collected which comprises about 8% of the charge to the still and consists of 60% para-diphenylbenzene and 40% meta-diphenylbenzene. These last two fractions may be used separately or in various combinations in obtaining the broad range of components indicated in composition I.

Composition II is prepared by following the same procedure initially described in connection with composition I, except that the meta-para fractions are collected together using a distillation temperature range (under atmospheric pressure) of from 375° C. to 390° C. Substantially the same composition may also be produced by heating biphenyl high boiler to a temperature of from 225° C. to 268° C. while under an absolute pressure of 55 mm. of mercury to separate a cut containing biphenyl and ortho-diphenylbenzene and then distilling the meta-para fraction from the residue, using a 1:1 reflux ratio, a distillation temperature range of from 268° C. to 283° C. and the above absolute pressure.

The preferred composition (composition III) is produced by separating the first three fractions in the manner described above in connection with composition I and then distilling from the residue the meta-para fraction boiling from 372° C. to 388° C. under atmospheric pressure. A similar product is also obtained by distilling biphenyl high boiler under an absolute pressure of 55 mm. of mercury and then selecting from the following fractions the cut having a boiling range of from 268° C. to 283° C.

| Time | Reflux Ratio | Column | Still | Hold Point of Distillate | Cut |
|---|---|---|---|---|---|
| Hrs. | | ° C. | ° C. | ° C. | |
| 0.5 | | | 250 | | First Fraction containing minor amounts of biphenyl. |
| 0.75 | | | 250 | | |
| 2.00 | Total | | 285 | | |
| 2.50 | 17:3 | 225 | 290 | 28 | Second Fraction consisting essentially of ortho-diphenylbenzene. |
| 5.00 | 17:3 | 240 | 295 | 36 | |
| 7.00 | 17:3 | 255 | 295 | 65 | |
| 7.30 | 15:5 | 255 | 295 | 65 | Third or intermediate fraction. |
| 10.00 | 15:5 | 268 | 315 | 83 | Fourth Fraction consisting essentially of meta- and para-diphenylbenzene. |
| 10.30 | 10:10 | 268 | 315 | 83 | |
| 12.30 | 10:10 | 275 | 327 | 84 | |
| 14.30 | 10:10 | 283 | 362 | 83 | |

Upon chlorinating mixtures I, II and III to a chlorine content of from 67% to 69.7% by weight and distilling the chlorinated products from the residue, compositions respectively having substantially the following analyses are obtained.

|  | Per cent |
|---|---|
| I'. Chlorinated meta-diphenylbenzene | 50 to 80 |
| Chlorinated para-diphenylbenzene | 20 to 50 |
| Chlorine content of mixture | 67 to 69.7 |
| II'. Chlorinated meta-diphenylbenzene | 75 to 80 |
| Chlorinated para-diphenylbenzene | 20 to 25 |
| Chlorine content of mixture | 67 to 69.7 |
| III'. Chlorinated meta-diphenylbenzene | 77 |
| Chlorinated para-diphenylbenzene | 23 |
| Chlorine content of mixture | 67 to 69.7 |

These products, particularly composition III', are eminently suitable for increasing the heat distortion temperature of vinyl aromatic polymers or copolymers. In addition, they render these polymers and copolymers non-inflammable and more resistant to plastic flow and also impart improved electrical properties thereto.

Combinations of the above products with vinyl aromatic polymers such as polystyrene result in compositions which are particularly valuable for electrical fixtures and other insulation purposes, especially in radio work where high frequency currents are employed. They may also be advantageously employed in other fields where non-inflammability and high heat distortion temperatures are important.

For a more complete understanding of the present invention reference is made to the following specific example.

Fifteen pounds of composition III was melted and charged into a reactor provided with a catalyst in the form of iron lathe turnings. The temperature of the molten mixture (about 155° C.) was raised to 180° C. and then vaporized chlorine was introduced at the rate of 6 to 8 grams per minute. During the reaction the temperature was allowed to gradually rise until a temperature of 300° C. was reached at the end of the chlorination.

The chlorination was carried out until an analysis of a sample showed that the product contained 69.1% by weight of chlorine, whereupon the crude chlorinated product was solidified by cooling and broken into lumps for charging into a distillation unit.

The lumps were then introduced into a still along with approximately 0.2% by weight of lime, and the mixture was distilled under an absolute pressure of 4 mm. of mercury and at a temperature of from 360° C. to 410° C.

The distillate thus obtained contained 69% by weight of chlorine, had a hold point of 270° C. and had substantially the following composition.

| | Per cent |
|---|---|
| Chlorinated meta-diphenylbenzene | 77 |
| Chlorinated para-diphenylbenzene | 23 |

The recovery of this product based on the crude chlorinated mixture was 90% of theory.

The reaction between chlorine and meta-para-diphenylbenzene mixtures is carried out at a temperature high enough to avoid loss of unreacted chlorine and to prevent freezing of the product at the end of the reaction. A reaction temperature of from about 180° C. to 300° C. is preferably employed, but it is to be understood that the invention is not restricted thereto.

The reaction is preferably executed in the presence of a catalyst and in place of iron lathe turnings other chlorination catalysts such as ferric chloride, aluminum chloride, antimony pentachloride, sulfur chloride, and iodine may be used.

The chlorine feed rate is not critical, but care should be taken to avoid excessive rates which result in high losses of unreacted chlorine. In general, a feed rate of about 8 to 10 grams of chlorine per minute produces highly satisfactory results.

The completion of the chlorination reaction is ascertained by analyzing the product for chlorine content, by determining its hold point or a combination of these methods.

The distillation step for the final product involves the use of a still capable of being heated to 450° C., an entrainment separator above the still and a condenser which can be maintained at a temperature of from 250° C. to 275° C. to prevent freezing of the product. This step is carried out under greatly reduced pressure, preferably under an absolute pressure of from 1 to 4 mm. of mercury, and at a temperature of from about 360° C. to about 430° C., it being understood that the optimum pressure and temperature will vary with the chlorine content of the mixture and also the relative amounts of chlorinated meta- and para-diphenylbenzene. It is also desirable in the interest of products of improved color to carry out the distillation in the presence of a small quantity of lime. For this purpose up to 5% and preferably from 0.1 to 1% by weight of solid lime is added to the crude chlorinated mixture prior to distilling same.

The distillation conditions for composition III' having been stated in Example I, the conditions for recovering compositions I' and II' will now be described.

In separating composition I' from the crude product obtained by chlorinating composition I to a chlorine content of from 67% to 69.7%, the distillation is effected under an absolute pressure of 4 mm. of mercury and at a temperature of from 360° C. to 430° C.

In the case of composition II', the distillation is executed under the same absolute pressure but at a temperature of from 360° C. to 410° C. and under these conditions, the product is obtained in an amount equivalent to about 92% by weight of the crude material charged to the still.

Inasmuch as the foregoing description comprises preferred embodiments of the invention, it is to be understood that these are merely exemplary and that changes and modifications may be made therein without departing from the scope of the invention which is defined in the appended claims.

This application is a continuation-in-part of application Ser. No. 451,492, filed July 18, 1942, in the name of Russell L. Jenkins, now Patent Number 2,489,215.

I claim:

1. A new composition of matter consisting essentially of a mixture of about 50% to about 80% by weight of chlorinated meta-diphenylbenzene and from about 20% to about 50% by weight of chlorinated para-diphenylbenzene, said mixture containing 68% by weight of chlorine.

2. A new composition of matter consisting essentially of a mixture of about 50% to 80% by weight of chlorinated meta-diphenylbenzene and about 20% to 50% by weight of chlorinated para-diphenylbenzene.

3. A new composition of matter consisting essentially of a mixture of about 50% to 80% by weight of chlorinated meta-diphenylbenzene and about 20% to 50% by weight of chlorinated para-diphenylbenzene, said mixture containing from 50% to 69.7% by weight of chlorine.

4. A new composition of matter consisting essentially of a mixture of about 75% to 80% by weight of chlorinated meta-diphenylbenzene and about 20% to 25% by weight of chlorinated para-diphenylbenzene.

5. A new composition of matter consisting essentially of a mixture of about 75% to 80% by weight of chlorinated meta-diphenylbenzene and about 20% to 25% by weight of chlorinated para-diphenylbenzene, said mixture containing from 50% to 69.7% by weight of chlorine.

6. A new composition of matter consisting essentially of a mixture of about 75% to 80% by weight of chlorinated meta-diphenylbenzene and about 20% to 25% by weight of chlorinated para-diphenylbenzene, said mixture containing from 67% to 69.7% by weight of chlorine.

7. A new composition of matter consisting essentially of a mixture of 77% by weight of chlorinated meta-diphenylbenzene and 23% by weight of chlorinated para-diphenylbenzene, said mixture containing from 67% to 69.7% by weight of chlorine.

8. The process of producing a new composition of matter, which comprises distilling the crude mixture obtained as a high boiling residue in the pyrolytic biphenyl synthesis process and thereby obtaining five fractions, one boiling, at atmospheric pressure, at 250° C. to 330° C., a second fraction boiling at 330° C. to 350° C., a third fraction boiling at 350° C. to 375° C., a fourth fraction boiling at 375° C. to 385° C. and a fifth fraction boiling at 385° C. to 390° C.; employing at least one of said last two mentioned fractions to provide a mixture consisting of 75% to 40% by weight of meta-diphenylbenzene and 25% to 60% by weight of para-diphenylbenzene; chlorinating said mixture until the resulting product contains from 67% to 69.7% by weight of chlorine; and then refining the chlorinated product by distillation.

9. The process of producing a new composition of matter, which comprises distilling the crude mixture obtained as a high boiling residue in the pyrolytic biphenyl synthesis process and thereby obtaining three fractions, one boiling, at an absolute pressure of 55 mm. of mercury, at 225° C. to 268° C., a second fraction boiling at 268° C. to 279° C. and a third fraction boiling at 279° C. to 283° C.; employing at least one of said last two mentioned fractions to provide a mixture consisting of 75% to 40% by weight of meta-diphenylbenzene and 25% to 60% by weight of para-diphenylbenzene; chlorinating said mixture until the resulting product contains from 67% to 69.7% by weight of chlorine; and then refining the chlorinated product by distillation.

10. The process of producing a new composition of matter, which comprises distilling the crude mixture obtained as a high boiling residue in the pyrolytic biphenyl synthesis process and thereby obtaining four fractions, one boiling at atmospheric pressure, at 250° C. to 330° C., a second fraction boiling at 330° C. to 350° C., a third fraction boiling at 350° C. to 375° C. and a fourth fraction boiling at 375° C. to 390° C. which consists of 75% to 65% by weight of meta-diphenylbenzene and from 25% to 35% by weight of para-diphenylbenzene; chlorinating said last mentioned fraction until the resulting product contains from 67% to 69.7% by weight of chlorine; and then refining the chlorinated product by distillation.

11. The process of producing a new composition of matter, which comprises distilling the crude mixture obtained as a high boiling residue in the pyrolytic biphenyl synthesis process and thereby obtaining four fractions, one boiling, at atmospheric pressure, at 250° C. to 330° C., a second fraction boiling at 330° C. to 350° C., a third fraction boiling at 350° C. to 375° C., and a fourth fraction boiling at 372° C. to 388° C. which consists of 70% by weight of meta-diphenylbenzene and 30% by weight of para-diphenylbenzene; chlorinating said last mentioned fraction until the resulting product contains from 67% to 69.7% by weight of chlorine; and then refining the chlorinated product by distillation.

12. The process of producing a new composition of matter, which comprises distilling the crude mixture obtained as a high boiling residue in the pyrolytic biphenyl synthesis process and thereby obtaining five fractions, one boiling, at atmospheric pressure, at 250° C. to 330° C., a second fraction boiling at 330° C. to 350° C., a third fraction boiling at 350° C. to 375° C., a fourth fraction boiling at 375° C. to 385° C. and a fifth fraction boiling at 385° C. to 390° C.; employing at least one of said last two mentioned fractions to provide a mixture consisting of 75% to 40% by weight of meta-diphenylbenzene and 25% to 60% by weight of para-diphenylbenzene; chlorinating said mixture until the resulting product contains from 50% to 69.7% by weight of chlorine; and then refining the chlorinated product by distillation.

13. The process of producing a new composition of matter, which comprises distilling the crude mixture obtained as a high boiling residue in the pyrolytic biphenyl synthesis process and thereby obtaining three fractions, one boiling, at an absolute pressure of 55 mm. of mercury, at 225° C. to 268° C., a second fraction boiling at 268° C to 279° C. and a third fraction boiling at 279° C. to 283° C.; employing at least one of said last two mentioned fractions to provide a mixture consisting of 75% to 40% by weight of meta-diphenylbenzene and 25% to 60% by weight of para-diphenylbenzene; chlorinating said mixture until the resulting product contains from 50% to 69.7% by weight of chlorine; and then refining the chlorinated product by distillation.

14. The process of producing a new composition of matter, which comprises distilling the crude mixture obtained as a high boiling residue in the pyrolytic biphenyl synthesis process and thereby obtaining four fractions, one boiling at atmospheric pressure, at 250° C. to 330° C., a second fraction boiling at 330° C. to 350° C., a third fraction boiling at 350° C. to 375° C. and a fourth fraction boiling at 375° C. to 390° C., which consists of 75% to 65% by weight of meta-diphenylbenzene and from 25% to 35% by weight of para-diphenylbenzene; chlorinating said last mentioned fraction until the resulting product contains from 50% to 69.7% by weight of chlorine; and then refining the chlorinated product by distillation.

RUSSELL L. JENKINS.

REFERENCES CITED

The following references are of record in the file of this patent:

UNITED STATES PATENTS

| Number | Name | Date |
|---|---|---|
| 2,041,594 | Clark | May 19, 1936 |
| 2,070,268 | Glass | Feb. 9, 1937 |